United States Patent

Wheeler et al.

[11] Patent Number: 5,230,481
[45] Date of Patent: Jul. 27, 1993

[54] CORD TAKE-UP DEVICE

[75] Inventors: Edwin L. Wheeler; Edwin R. Peterson, both of Boise, Id.

[73] Assignee: Preco New Products Corp., Boise, Id.

[21] Appl. No.: 885,523

[22] Filed: May 18, 1992

Related U.S. Application Data

[63] Continuation-in-part of Ser. No. 532,648, Jun. 4, 1990, Pat. No. 5,114,091.

[51] Int. Cl.$^5$ .............................................. B65H 75/48
[52] U.S. Cl. ................................ 242/107.1; 242/107.5
[58] Field of Search .............. 242/107, 107.1–107.15, 242/107.2, 107.3, 107.5, 107.6, 107.7, 100.1

[56] References Cited

U.S. PATENT DOCUMENTS

| | | | |
|---|---|---|---|
| 3,007,653 | 11/1961 | Becker | 242/107.5 |
| 3,211,496 | 10/1965 | Zaydel | 242/107.11 |
| 3,246,363 | 4/1966 | Rogas et al. | 242/107.5 X |
| 4,417,703 | 11/1983 | Weinhold | 242/107.12 |
| 4,646,987 | 7/1984 | Peterson | 242/107.11 |
| 5,022,600 | 6/1991 | Blanc et al. | 242/107.1 |

Primary Examiner—John M. Jillions
Attorney, Agent, or Firm—Frank J. Dykas; Craig M. Korfanta; Ken J. Pedersen

[57] ABSTRACT

The invention is a dual reel cord take-up device for flat wire cable which has a generally semi-cylindrical upper and lower case half which snap together over a dual-purpose shaft to make two compartments. The first compartment is a cord take-up compartment which is divided in two by a slotted rib on the shaft in that compartment. Flat wire cable is received in both sides of the compartment through apertures in the walls of the compartment. In the second compartment is a flat coil spring fixed on its outside end to a generally cylindrical spring cup within said compartment, and fixed on its inside end to the dual-purpose shaft in that compartment. The spring cup is biased against rotation except to tighten the spring, so the shaft is continually under tension to rotate and retrieve the cable into the take-up compartment.

4 Claims, 4 Drawing Sheets

CORD TAKE-UP DEVICE

CROSS-REFERENCE TO RELATED APPLICATIONS

This application is a continuation-in-part of our co-pending application Ser. No. 07/532,648 filed Jun. 4, 1990, now U.S. Pat. No. 5,114,09 and entitled: "Dual Reel Cord Take-Up Device".

DESCRIPTION

Background of the Invention

1. Technical Field

This invention relates generally to take-up devices for electrical cords, and more particularly to those take-up devices for flat wire cables used in communications and data transmission. What we have invented is an economical dual reel cord take-up device.

2. Background Art

U.S. Pat. No. 4,646,987 (Peterson) discloses a single reel take-up device for connecting a telephone and a cooperating handset.

Our co-pending application Ser. No. 07/532,648 discloses a dual reel cord take-up device with a cord slot hole 31 in main spool disk 28, side spool disk 32 and main spring housing 40.

Still, there is a need in the cord take-up industry for a more economical dual reel take-up device with fewer parts and which may be more easily manufactured.

DISCLOSURE OF THE INVENTION

What we have invented is:

A dual reel cord take-up device for flat wire cable which comprises:

(a) a generally semi-cylindrical upper case half with two parallel compartments in a direction perpendicular to the axis of the cylinder, the first compartment being adapted to receive the first end of a dual-purpose shaft, and the second compartment being adapted to receive the second end of said dual-purpose shaft and a spring cup, said upper case half having snap-fit means for receiving a lower case half and means for receiving a flat wire cable;

(b) a generally semi-cylindrical lower case half, also with two compartments which correspond to said first and second compartments of said upper case half, said lower case half also having snap-fit means for receiving and cooperating with said upper case half snap-fit means for receiving and retaining said upper case half in fixed relationship, said lower case half having means for receiving a flat wire cable and having said second compartment having means for holding said spring cup in said second compartment against rotation in one direction but not the other;

(c) a dual-purpose shaft supported and held in rotatable relationship by both said upper and lower case halves, said shaft being provided on its first end in said first compartment of said upper and lower case halves with a slotted rib which divides said first end of the shaft into two adjacent reels for receiving flat wire cable, said shaft being provided on its second end in said second compartment of said upper and lower case halves with a slot in the shaft for receiving a spring within said spring cup;

(d) a generally cylindrical spring cup within said second compartment of said upper and lower case halves, said spring cup having an outer surface perpendicular to its axis of rotation, means cooperating with the holding means to hold the cup against rotation relative to said upper and lower case halves in one direction but not in the other direction and spring stop means on its inner cylindrical surface for fixing one end of the spring to said spring cup; and (e) a flat coil spring within said spring cup, said spring being fixed on its outer end to said spring cup and being fixed on its inner end to said second end of said dual-purpose shaft.

Also, our invention includes the take-up device above wherein:

the axial surface of the dual-purpose shaft in the first compartment is an enlarging spiral in the direction of rotation when cable is being added to the shaft;

the holding means in the second compartment are notches, which notches cooperate and interact with the cooperating means of the spring cup which are resilient prongs on its outer cylindrical surface; and, the spring cup has detent means on its outer surface perpendicular to its axis of rotation for winding the spring.

From the practice of our invention a more economical dual reel take-up device with fewer parts and which may be more easily manufactured is provided.

BEST MODE FOR CARRYING OUT INVENTION

Figure 1:
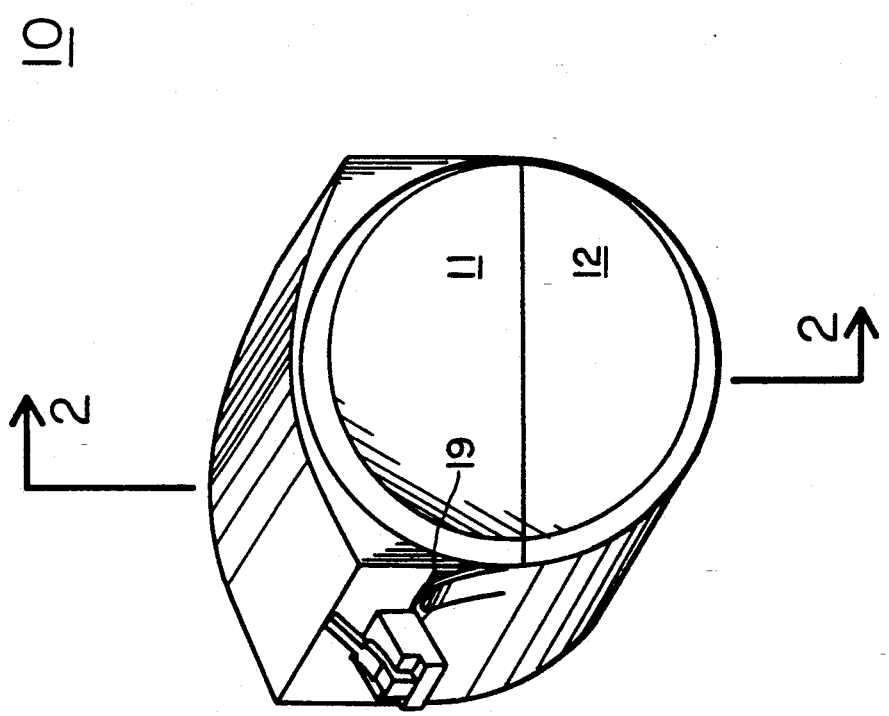
FIG. 1 is a perspective view of our improved cord take-up device.
Figure 2:
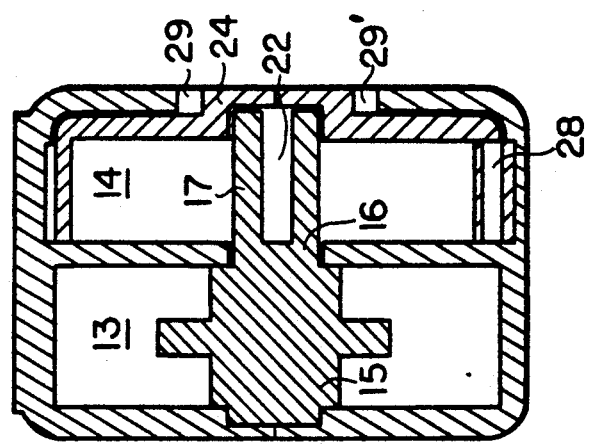
FIG. 2 is a cross-sectional view along line 2—2 in FIG. 1.
Figure 3:
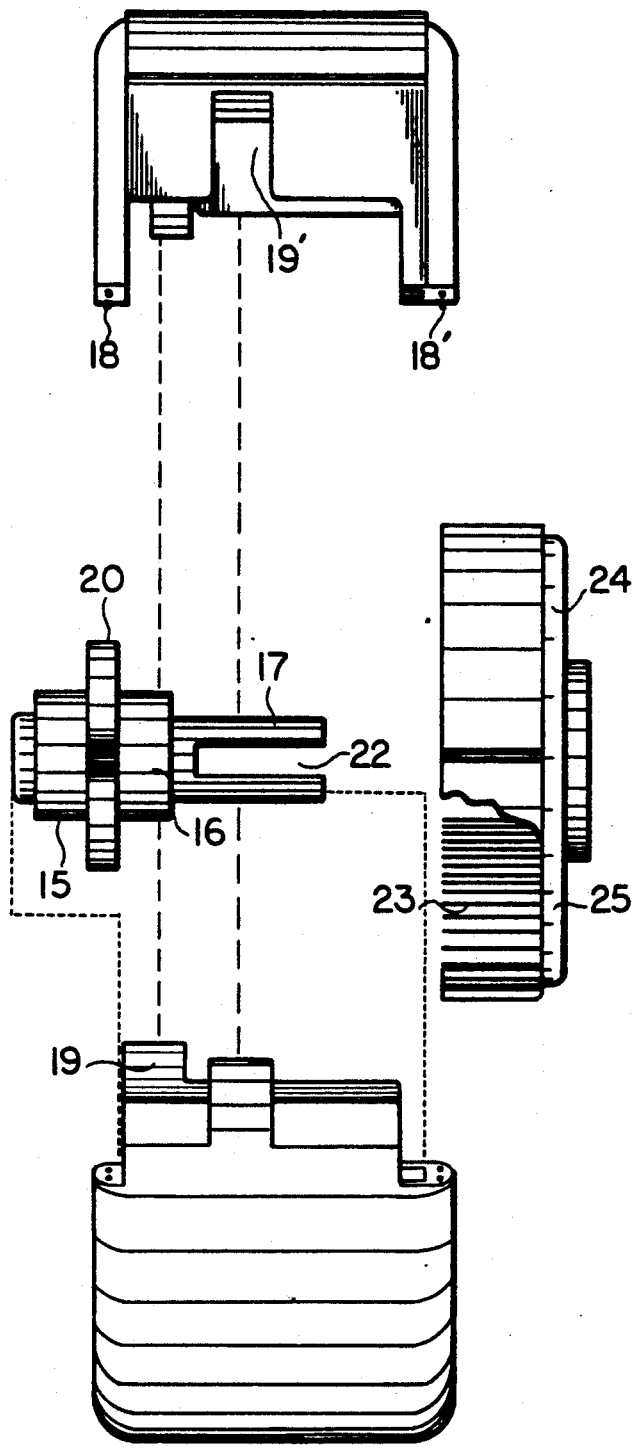
FIG. 3 is an exploded, partly cross-sectional side view of our improved cord take-up device.
Figure 5:
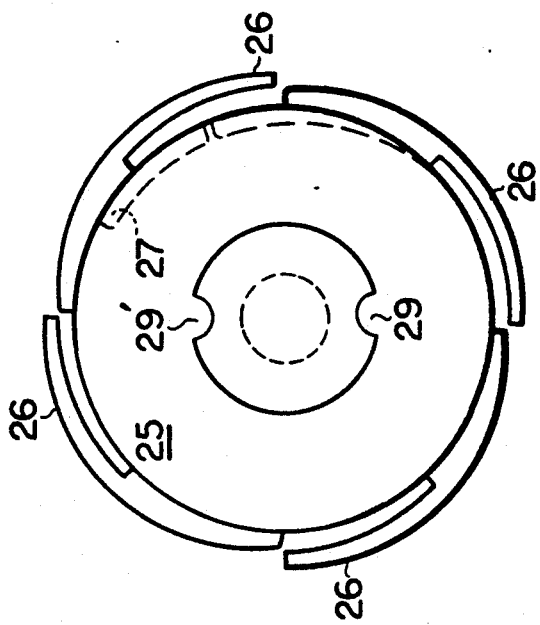
FIG. 5 is a side, outside view of the spring cup of our improved cord take-up device.
Figure 4:
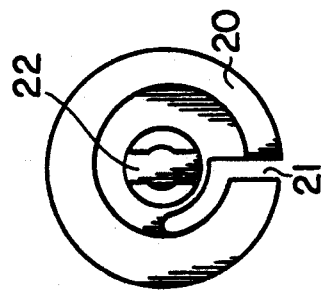
FIG. 4 is a side, partly cross-sectional view of the dual-purpose shaft of our improved cord take-up device.

Referring to the Figures, there is depicted generally our improved cord take-up device 10. Generally semi-cylindrical upper case half 11 and lower case half 12 snap fit together to form two parallel compartments, first compartment 13 and second compartment 14 inside take-up device 10. The two compartments are parallel in a direction perpendicular to the axis of the cylinder which the upper and lower case halves create. First compartment 13 is adapted to receive and support in rotatable relationship first end 15 of dual-purpose shaft 16. Likewise, second compartment 14 is adapted to receive and support in rotatable relationship second end 17 of dual-purpose shaft 16.

Upper and lower case halves 11 and 12 both have cooperating snap-fit means 18 and 18' for receiving and cooperating with one another for retaining said upper and lower case halves in fixed mutual relationship. Also, upper and lower case halves 11 and 12 both have means for receiving flat wire cable, generally apertures 19 and 19' in the walls of the upper and lower case halves, or otherwise in the walls of the first cord take-up compartment.

In first compartment 13 the flat wire cable is taken up or dispensed by wrapping it, or unwrapping it, respectively, around first end 15 of dual purpose shaft 16. First end 15 has a slotted rib 20 which divides it into two adjacent reels for receiving flat wire cable. When initially installing the cable on shaft first end 15, the midpoint of the cable is slid into radial slot 21 of rib 20. This way, the shaft can take up or dispense cable from both ends of first end 15, effectively doubling the capacity of the take-up device.

In second compartment 14, the second end 17 of dual purpose shaft 16 has diametric slot 22 for receiving the inside end of coiled flat spring 23. Spring 23 is received and fixed at its outside end by spring cup 24 contained within second compartment 14. Spring cup 24 is generally cylindrical with an outer cap surface 25 perpendicular to its axis of rotation, cooperating means 26 which are resilient prongs on its outer cylindrical surface and spring stop means 27 on its inner cylindrical surface. Cup cooperating means 26 is received by and cooperates with second compartment holding means 28 which are notches in the inner cylindrical wall of the second compartment. This way, spring cup 24 is held against rotation except to tighten the spring 23, so the shaft 16 is continually under tension to rotate away from the spring tension and retrieve the cable into the first take up compartment 13.

Preferable, the axial surface of shaft first end 15 is an enlarging spiral in the direction of rotation when cable is being added to the shaft. This way, the roll-up and roll-down action of the take-up device is smoothed in the area of radial slot 21 where the first complete wrap of cable encounters the initial layer of cable.

Also, preferably, spring cup outer cap surface 25 has detents 29 and 29' to permit engagement therein of a simple spanner type tool end for initially tightening the spring 23. This way, our take-up device may be more easily assembled.

Our take-up device components may be made from firm plastic or other polymeric materials by conventional molding means.

To assemble our invention, first the cable is pressed into radial slot 21 of shaft 16 and each end is led out apertures 19 and 19'. Then, spring 23 is engaged on its inside end in diametric slot 22 of shaft 16, and on its outside end in spring cup spring stop means 27, and the shaft and spring cup is placed between upper and lower case halves 11 and 12, respectively. Then, the case halves are snapped together, and detents 29 and 29' are turned to tighten the spring 23.

While there is shown and described the present preferred embodiment of the invention, it is to be distinctly understood that this invention is not limited thereto but may be variously embodied to practice within the scope of the following claims.

What we claim is:

1. A dual reel cord take-up device for flat wire cable which comprises:
   (a) a generally semi-cylindrical upper case half with two parallel compartments in a direction perpendicular to the axis of the cylinder, the first compartment being adapted to receive the first end of a dual-purpose shaft, and the second compartment being adapted to receive the second end of said dual-purpose shaft and a spring cup, said upper case half having snap-fit means for receiving a lower case half and means for receiving a flat wire cable;
   (b) a generally semi-cylindrical lower case half, also with two compartments which correspond to said first and second compartments of said upper case half, said lower case half also having snap-fit means for receiving and cooperating with said upper case half snap-fit means for receiving and retaining said upper case half in fixed relationship, said lower case half having means for receiving a flat wire cable and said second compartment having means for holding said spring cup in said second compartment against rotation in one direction but not the other;
   (c) a dual-purpose shaft supported and held in rotatable relationship by both said upper and lower case halves, said shaft being provided on its first end in said first compartment of said upper and lower case halves with a slotted rib which divides said first end of the shaft into two adjacent reels for receiving flat wire cable, said shaft being provided on its second end in said second compartment of said upper and lower case halves with a slot in the shaft for receiving a spring within said spring cup;
   (d) a generally cylindrical spring cup within said second compartment of said upper and lower case halves, said spring cup having an outer surface perpendicular to its axis of rotation, means cooperating with the holding means to hold the cup against rotation relative to said upper and lower case halves in one direction but not in the other direction and spring stop means on its inner cylindrical surface for fixing one end of the spring to said spring cup; and
   (e) a flat coil spring within said spring cup, said spring being fixed on its outer end to said stop means of said spring cup and being fixed on its inner end to said slot of said second end of said dual-purpose shaft.

2. The take-up device of claim 1 wherein the axial surface of the dual-purpose shaft in the first compartment is an enlarging spiral in the direction of rotation when cable is being added to the shaft.

3. The take-up device of claim 1 wherein the holding means in the second compartment are notches which notches cooperate and interact with the cooperating means of the spring cup which are resilient prongs on its outer cylindrical surface.

4. The take-up device of claim 1 wherein the spring cup has detent means on its outer surface perpendicular to its axis of rotation for winding the spring.

* * * * *